United States Patent
Klensin et al.

(10) Patent No.: US 6,564,327 B1
(45) Date of Patent: May 13, 2003

(54) METHOD OF AND SYSTEM FOR CONTROLLING INTERNET ACCESS

(75) Inventors: John Klensin, Cambridge, MA (US); Rohit Khare, Ellicott City, MD (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/219,411

(22) Filed: Dec. 23, 1998

(51) Int. Cl.[7] .............................. G06F 11/30; H04K 1/00
(52) U.S. Cl. .......................................... 713/201; 380/23
(58) Field of Search .................................. 713/201, 202

(56) References Cited

U.S. PATENT DOCUMENTS 5,825,283 A * 10/1998 Camhi ........................ 340/438
6,052,730 A * 4/2000 Felciano et al. ............ 709/225
6,161,107 A * 12/2000 Stern .......................... 707/104
6,192,403 B1 * 2/2001 Jong et al. ................... 709/224

* cited by examiner

Primary Examiner—Norman M. Wright (57) ABSTRACT

A method of and system for controlling access to the Internet by members of an organization that includes at least one supervisor and at least one non-supervisor for which limited Internet access is desired. The system maintains for each member of the organization a session identifier. When the system establishes an Internet session between a member of the organization and the Internet, the system initially sets a user session identifier for said Internet session to a default session identifier, which is the session identifier for the lowest access level member of the organization. When the member requests a resource, the system determines if an access level rating for requested resource is greater than the value of the access level field of the user session identifier. If so, the system blocks the resource and presents member with choices of logging on to the system as a specific member of the organization with a higher access level, or appealing the blocking to a supervisor.

41 Claims, 7 Drawing Sheets

METHOD OF AND SYSTEM FOR CONTROLLING INTERNET ACCESS

FIELD OF THE INVENTION

The present invention relates generally to computer networks, and more particularly to a method of and system for controlling access to the Internet or the world wide web by providing a filtering proxy server that accesses a policy provider for judgments as to the suitability of a particular resource for a particular user.

DESCRIPTION OF THE PRIOR ART

The Internet and the world wide web have experienced explosive growth. Everyday, more content is added to the Internet and more users gain access to the Internet. The Internet enables more people to gain access to more information more quickly than ever before.

Almost everyone sees the tremendous educational, research, and entertainment value of the Internet. Children and other inquisitive people can explore new areas in ways that were not possible before. Similarly, employees and business professionals can explore industry trends, obtain information on competitors and their products, and generally expand their knowledge base. Accordingly, a substantial number of parents, educators, and business leaders provide Internet access to their children, students and employees and encourage them to use the Internet.

For all the information on the Internet that most people consider to be good and valuable, there is a substantial amount of information that some people find objectionable and or inappropriate. Many sites contain adult material such as nudity, violence, and intolerance all disclosed in various degrees of explicitness. While it is unlikely that anyone would want to prevent entirely their child or student from accessing information on the Internet, it is equally unlikely that anyone would want a young child to access scenes of explicit vulgarity or sites advocating violent or hateful action toward members of various groups. Less controversially, while there is nothing objectionable about Internet versions of mainstream newspapers and magazines, most businesses would prefer their employees not to spend their working time reading sports reports and or comics.

Presently, the on-line services market is divided into quite separate camps. On one side are the on-line environments such as AMERICA ONLINE, COMPUSERVE AND PRODIGY. Initially, these services provided their own content. Accordingly, on-line environments had virtually complete control over what was available. The other side of the on-line market is occupied by access providers, which provide little more than access to the Internet without an appreciable amount of their own content. Recently, on-line environments have begun to move toward the access provider side by providing gateways to the Internet. Increasingly, customers of on-line environments are using their service to access the public Internet rather than to obtain content created by the on-line environment provider.

The controversy about limiting access to objectionable material on the Internet, and particularly the world wide web, has put the spotlight squarely on the vacuum between these two service models. On-line environments claim to be "kid-safe", but they cannot guarantee it, especially insofar as they provide gateways to the whole Internet. Access providers try to avoid any perception that they can control the content or applications their services deliver. Instead, access providers place the burden on parents to install and configure content filtering software, which may be complex or simplistic, on their own.

The platform for content selection (PICS) provides an infrastructure for controlling access to the Internet. PICS allows Internet sites, pages, or other resources to be classified with PICS labels. Each PICS label associated with an Internet site or page classifies the site or page according to the rating specified in the label. A rating provider assigns objective values to the PICS label for a resource. PICS products filter web content according to the PICS labels.

There are a number of shortcomings in presently available PICS products and services. Primarily, current products and services fail to personalize their filtering. Today's firewalls and proxy servers filter everyone's request against a single set of criteria. Thus, currently existing products and services do not recognize the differences in maturity level and sensitivities of different members of an organizations such as a family. Furthermore, the filtering criteria are either simplistic black lists or overly complex multi-dimensional content ratings. In the black list schemes, a binary approach is used to block or not block access by everyone to a particular resource based upon a rater's judgment. Examples of multi-dimensional systems are RSACi, which describes various levels of sex, nudity, violence, and harsh language, and SafeSurf, which provides twelve themes and nine levels within each theme.

The multi-dimensional systems provide great flexibility by which parents can tailor their filtering based upon their values and their children's maturity and sensitivity. However, the multi-dimensional systems tend to be too complex for the average parent to use. Moreover, multi-dimensional systems measure content against several categories but they do not necessarily evaluate the resource as a whole.

SUMMARY OF THE INVENTION

The present invention provides a method of and system for controlling access to the Internet by members of an organization that includes at least one supervisor and at least one non-supervisor for which limited Internet access is desired. The organization may be any commercial or non-commercial organization. In one of its aspects, the organization may be a family, with the supervisor being a parent and the non-supervisor being a child. In another of its aspects the organization may be a school, with the supervisor being a teacher and the non-supervisor being a student. The organization may also be a business, with the supervisor being a manager or a system administrator and the non-supervisor being a regular employee.

The system maintains a user session identifier for each member of the organization. Each user session identifier includes an access level field, which contains an access level set for the organization member, and a supervisor field, which indicates whether or not the organization member is a supervisor. The user session identifier may also include a field that specifies whether not unrated sites or resources are to be blocked. Where the non-supervisor members of the organization are children, the access level is preferably is an age level.

When the system establishes an Internet session between a member of the organization and the Internet, the system initially sets a user session identifier for the session to a default user session identifier. The default user session identifier is the session identifier for the lowest access level member of the organization. When the member requests a resource, the system determines if the requested resource is suitable for an individual with the access level of the current user session identifier. Preferably, in the embodiment in which non-supervisory members are children, the access level is an age rating. The system determines if the access level rating for requested resource is greater than the value of the access level field of the user session identifier. If so, the system blocks the resource and presents the member with choices of logging on to the system as a specific member of the organization with a higher access level, or appealing the blocking to a supervisor.

If the member chooses to appeal the blocking, the locator for the blocked resource is placed in a list of sites awaiting supervisor review. If the member chooses to logon as a specific member of the organization, the system authenticates the logon and sets an updated user session identifier to the session identifier for the specific member of the organization. If the updated user session identifier indicates that the member is a supervisor, the system presents the supervisor with the list of sites awaiting supervisor review. If the supervisor believes that a blocked site is appropriate for access by the non-supervisor, the supervisor can place the blocked site on a exception list. The next time the non-supervisor logs on, the system advises the non-supervisor of the previously blocked sites placed on the exception list.

Whenever a member of the organization requests a resource, the system associates the current user session identifier with the request. In the preferred embodiment, a supervisor or parent has access to any site or resource. Accordingly, if the supervisor field identifies the requestor as a supervisor, the system forwards the requested resource to the requestor. If the requester is not a supervisor, then the system determines if the requested resource is on the exception list for the requester, and if so, the system forwards the requested resource to the requester.

If the requested resource is not on the exception list, then the system determines if the requested resource is appropriate for the user. The present invention introduces the concept of a policy provider. A policy provider provides a subjective judgment as to whether a particular resource is suitable for a particular user. A policy provider is thus different from a rating provider, which provides either (i) an objective binary suitable/not-suitable judgment for a particular resource regardless of the requester, or (ii) a set of ratings that a parent or supervisor may use in determining whether the resource is suitable for the user.

If the organization has designated a policy provider, the system queries the designated policy provider for a determination of the suitability of the requested resource for the user. In the embodiment in which the organization is a family, the policy provider returns an age value, which the system compares to the age set for the user in the access level in the session identifier.

The system may also determine if the requested resource has a ratings label. Since many publishers and rating providers use rating systems based upon criteria other than age, the system of the present invention includes a policy interpreter or reifier that converts multi-variate and non-age-based ratings into an age rating. If the highest or most stringent rating is greater than the level access specified in the user session identifier, the system blocks the resource. Additionally, if the resource is unrated and the user session identifier indicates that unrated resources are to be blocked, the system blocks the resource. Otherwise, the system forwards the resource to the requester.

In the preferred embodiment of the invention in which the non-supervisory members of the organization are children, the access level of a child is specified by an age value. The age value of the child's session identifier may be the child's actual chronological age, or it may be a "virtual age" selected by the parent based upon the maturity level of the child and the parent's experience with ratings provided by the policy provider.

DESCRIPTION OF THE PREFERRED EMBODIMENT

Figure 1:
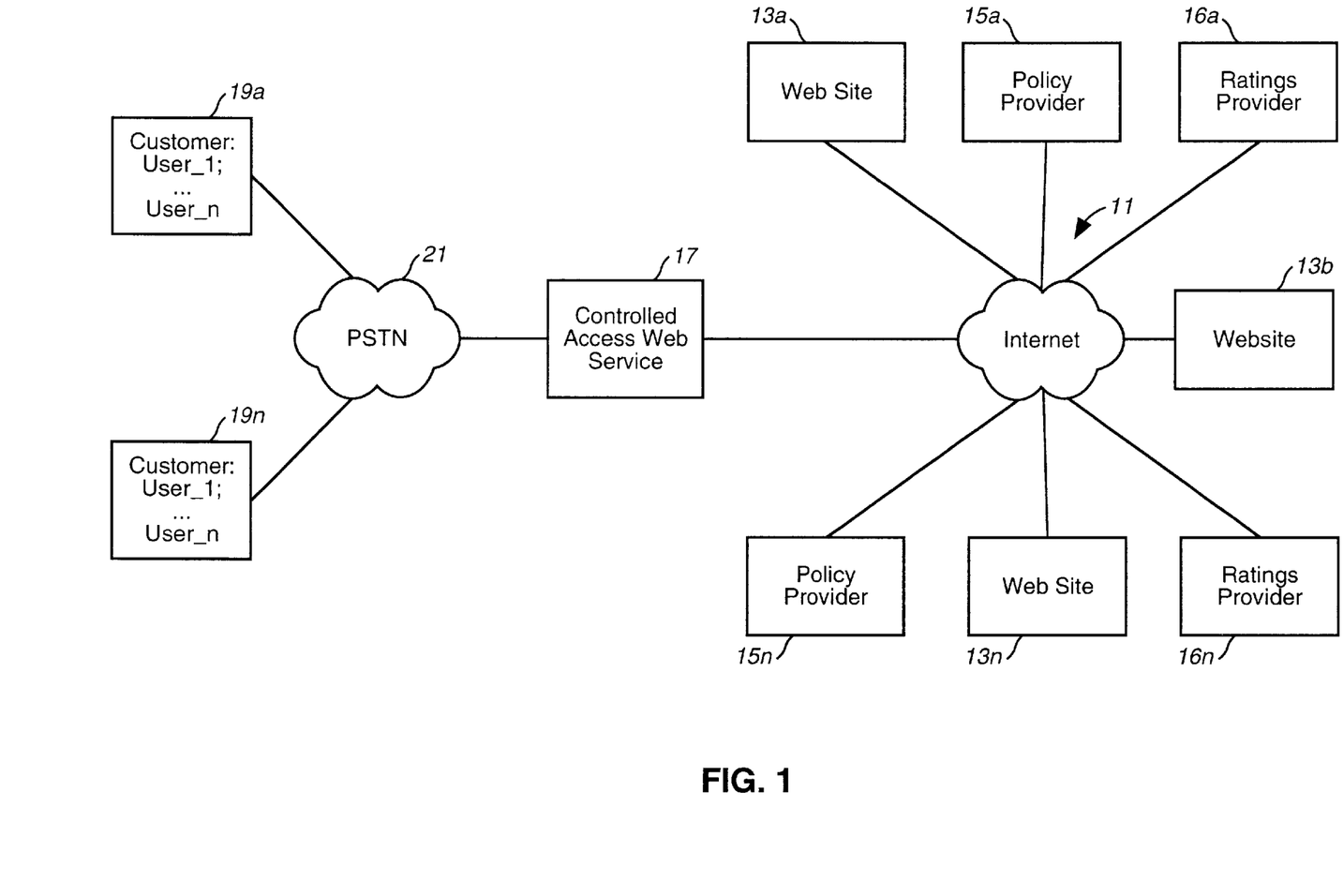
FIG. 1 is a high level block diagram of a system according to the present invention.

Referring now to the drawings, and first to FIG. 1, the Internet is designated generally by the numeral 11. The Internet comprises a plurality of web sites 13-N and communications facilities, as is well known to those skilled in the art. Web sites 13 provide Internet content in response to requests from users.

In the system of the present invention, users access a plurality of policy providers 15a–n. Policy providers 15 are services that make subject judgments as to the suitability of the content of particular Internet sites, pages, or other resources for particular individuals. Policy providers are different from the ratings providers 16 of the prior art, the ratings provider 16 give objective ratings to resources without regard to who is requesting the resource. In the preferred embodiment, in which the non-supervisory members are children, the policy provider gives each resource an age rating based upon the content of the resource as a whole. Internet users can use the services of a policy provider that appears to share the values and sensibilities of the user and in whose judgment the user trusts.

According to the present invention, a controlled access web service 17 provides access between a plurality of customers 19a–n and the Internet 11. In the preferred embodiment of the present invention, in which customers 19 represent families using home personal computers, customers 19 use dial-up connections through a public switch telephone network PSTN 21 to establish Internet sessions through controlled access web service 17.

Typically, each customer 19 includes several users. In the family context, one or two of the users are parents and the other users are children. According to the present invention, a parent can use controlled access web service 17 to filter Internet content to each child individually.

Generally, and as will be explained in detail hereinafter, before according a user's path through the system, according to the present invention includes several phases. First, a user 19 dials up controlled access web service 17 through PSTN 21 and provides to controlled access web service a customer account identifier and password, as is well known. Controlled access web service 17 authenticates the customer account identifier and the password and establishes the Internet session. Thereafter, each web request is filtered through a proxy in controlled access web service 17 according to the policies set for the particular customer. If the access policy is violated, controlled access web service 17 manages an exception cycle, which includes blocking the violating web page, reporting the reason for the blocking and prompting the user either to upgrade to a higher access level or to appeal the blocking for later parental review.

Figure 2:
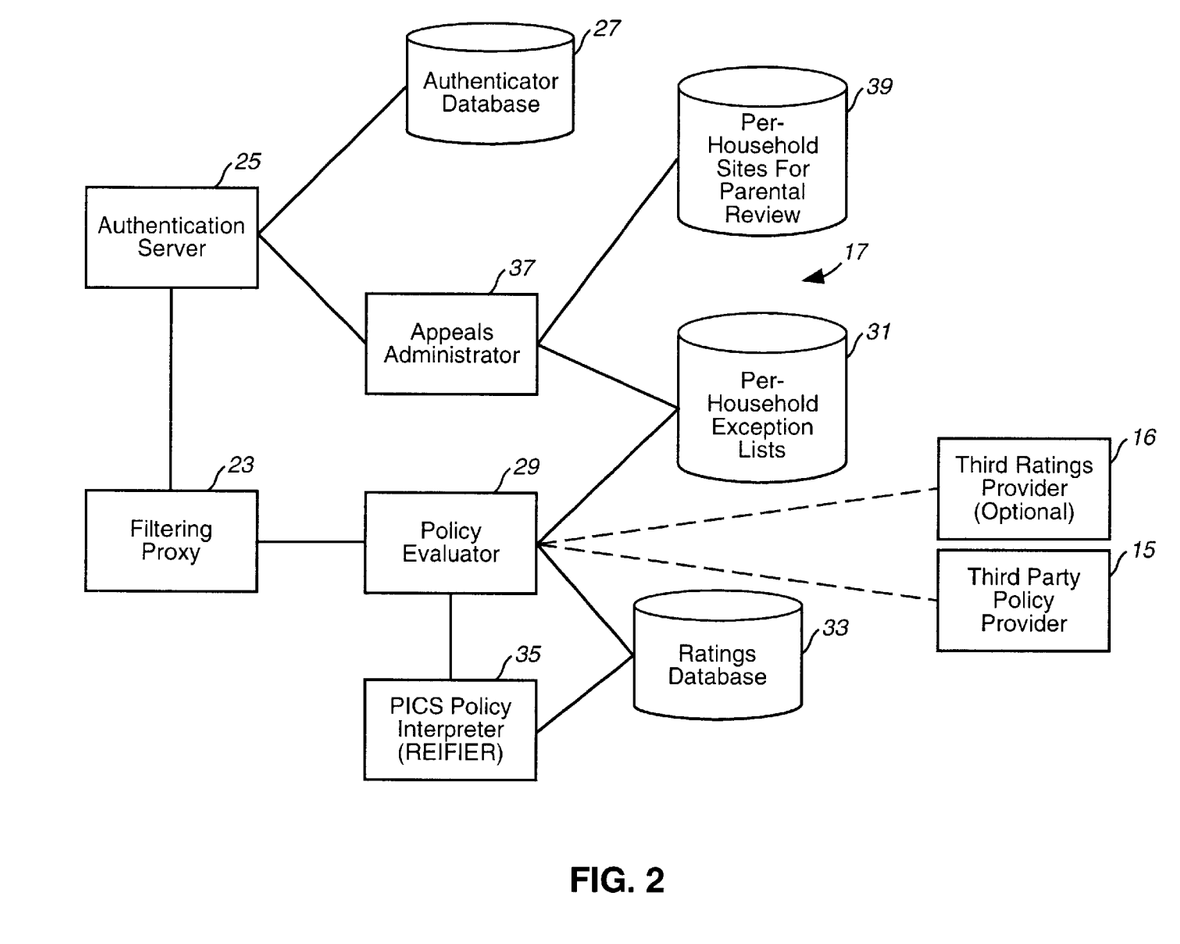
FIG. 2 is a block diagram of a preferred embodiment of a controlled access web service according to the present invention.

Referring now to FIG. 2, controlled access web service 17 includes a filtering proxy 23 and an authentication server 25. When a customer or family initially establishes a dial-up connection, authentication server 25 accesses an authenticator database 27, which contains authentication information. Authenticator database 27 also includes for each user associated with the customer, a session identifier. In the preferred family oriented embodiment of the present invention, each session identifier contains a parent field, which contains a bit that indicates whether or not the user is a parent, a block unrated field, which contains a bit that indicates whether or not to block unrated sites, and an access level field, which in the preferred embodiment contains the age of the user. The age may be either the actual chronological age of a child or a virtual age that may be greater than or less than the actual age of the child, depending upon the maturity level of the child and the parent's experience with the rating system. Authenticator database 27 also identifies the third party policy provider that the customer has selected.

Upon authentication of the initial logon, authentication server 25 passes to filtering proxy 23 session parameters and the Internet session is established. The session parameters include the identity of the third party policy provider and the session identifier for the user. Initially, the user session identifier is a default session identifier, which is the session identifier for the youngest member of the family.

During the session, filtering proxy 23 tags each request for a page or resource with the current user session identifier. Filtering proxy 23 fetches the requested resource and then forwards the resource to a policy evaluator 29 for an evaluation. In the preferred embodiment, a parent is entitled to view anything on the web. Accordingly, if the parent bit of the user session identifier is set to parent, the requested page is returned to filtering proxy 23 and forwarded to the customer. Initially, however, since the default user session identifier is the session identifier for the youngest child of the family, the parent bit is not set to parent.

Policy evaluator 29 accesses a database 31 of per household exception lists. An exception list contains, for each user, a list of pages or sites that would otherwise be blocked for the user but, upon parental review, have been determined to be appropriate for access by the user. If the requested page is not in the per household exception list, then the policy evaluator 29 accesses the appropriate third party policy provider 15. The policy provider returns a judgment as to the suitability of the requested resource for the user. In the preferred embodiment, the policy provider returns an age value, which policy evaluator 29 compares to the user session identifier. Policy evaluator 29 may cache the judgment received from policy provider 15 in a ratings database 33 for later reuse.

Optionally, the system may consult a ratings provider 16 for a conventional PICS label. Accordingly, controlled access web service 17 includes a PICS policy interpreter or reifier 35, which contains transfer functions that convert the rating received from ratings provider 16 to an age based rating. If the rating received by policy evaluator 29 is greater than the age of the user set forth in the user session identifier, policy evaluator 29 returns a "block" to filtering proxy 23. If policy evaluator 29 does not receive a rating, then policy evaluator 29 checks whether or not the current session identifier indicates that unrated sites should be blocked. If so, policy evaluator 29 returns a block to filtering proxy 23.

When filtering proxy 23 receives a block from policy evaluator 29, filtering proxy 23 forwards to the customer a page that indicates that the requested resource has been blocked. The page forwarded to the customer contains controls that enable the customer to logon at a higher access level, appeal the block, or accept the block. The processes of logging on at a higher access level or appealing are handled by authentication server 25.

If the user chooses to appeal the block, authentication server 25 passes the appeal to an appeals administrator 37, which adds the locator for the blocked site to a per household list of sites for parental review contained in a database 39. If the user chooses to logon as a specific user, then authentication server 25 invokes second level authentication and accesses authenticator database 27. Second level authentication may be by means of a specific user ID and password or, in the case of younger children with a smartcard or token system. If second level authentication is valid, then authentication server 25 passes the user session identifier for the authenticated user to filtering proxy server 23. If the specific user is a parent, then appeals administrator 37 fetches the pending list of sites for parental review from database 39 and forwards that list to the parent. The parent may review the list and the sites. The parent may either overrule the blocking, in which case the locator for the blocked site is placed in the appropriate per household exception list in database 31, or affirm the blocking. According to the present invention, the next time the customer initially logs on to controlled access web service 17, the customer is presented with a list of sites added to the per household exception list. If the parent finds that he or she consistently overrules the blocking of pages or sites, the parent may raise the age for the child or choose another policy provider.

Figure 3:
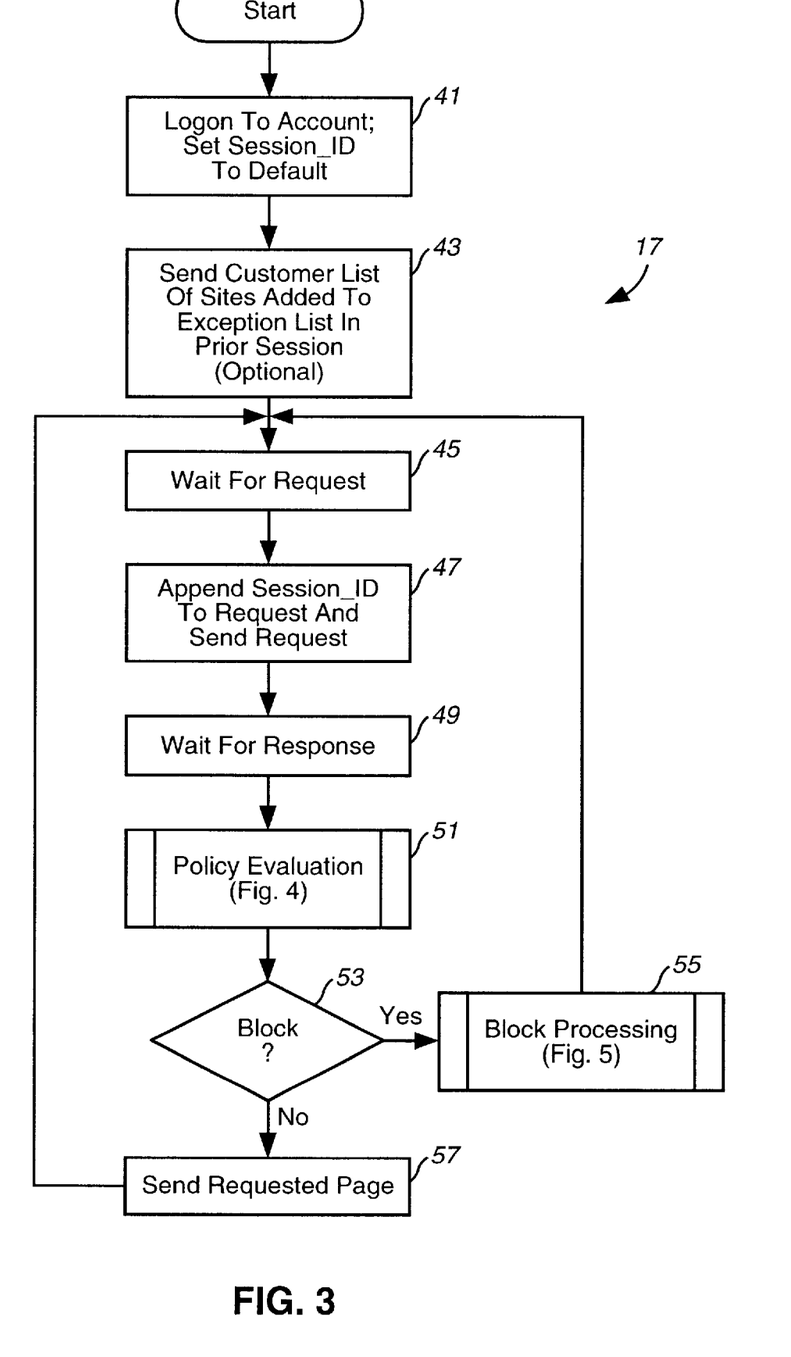
FIG. 3 is a high level flowchart of processing performed by the controlled access web service of the present invention.

Referring now to FIG. 3, there is shown a high level flow chart of the processing that occurs in controlled access web service 17. First, at block 41, upon initial logon to the account, the system sets the user session identifier to the default values. Then, the system sends to the customer a list of sites added to the exception list in the prior session, at block 43, and waits for a request at block 45. When the system receives the request, the system appends the user session identifier to the request and sends the request, at block 47. Then, the system waits for a response, at block 49. When the system receives the response, the system performs policy evaluation, indicated generally at block 51, and shown in detail with respect to FIG. 4. Policy evaluation returns either a "block" or "not block." If, at decision block 53, policy evaluation returns a block, then the system performs block processing, indicated generally at block 55, and shown in detail with respect to FIG. 5. If, at decision block 53, policy evaluation returns not blocked, then the system sends the requested page to the customer, at block 57, and returns to block 45 to wait for another request.

Figure 4A:
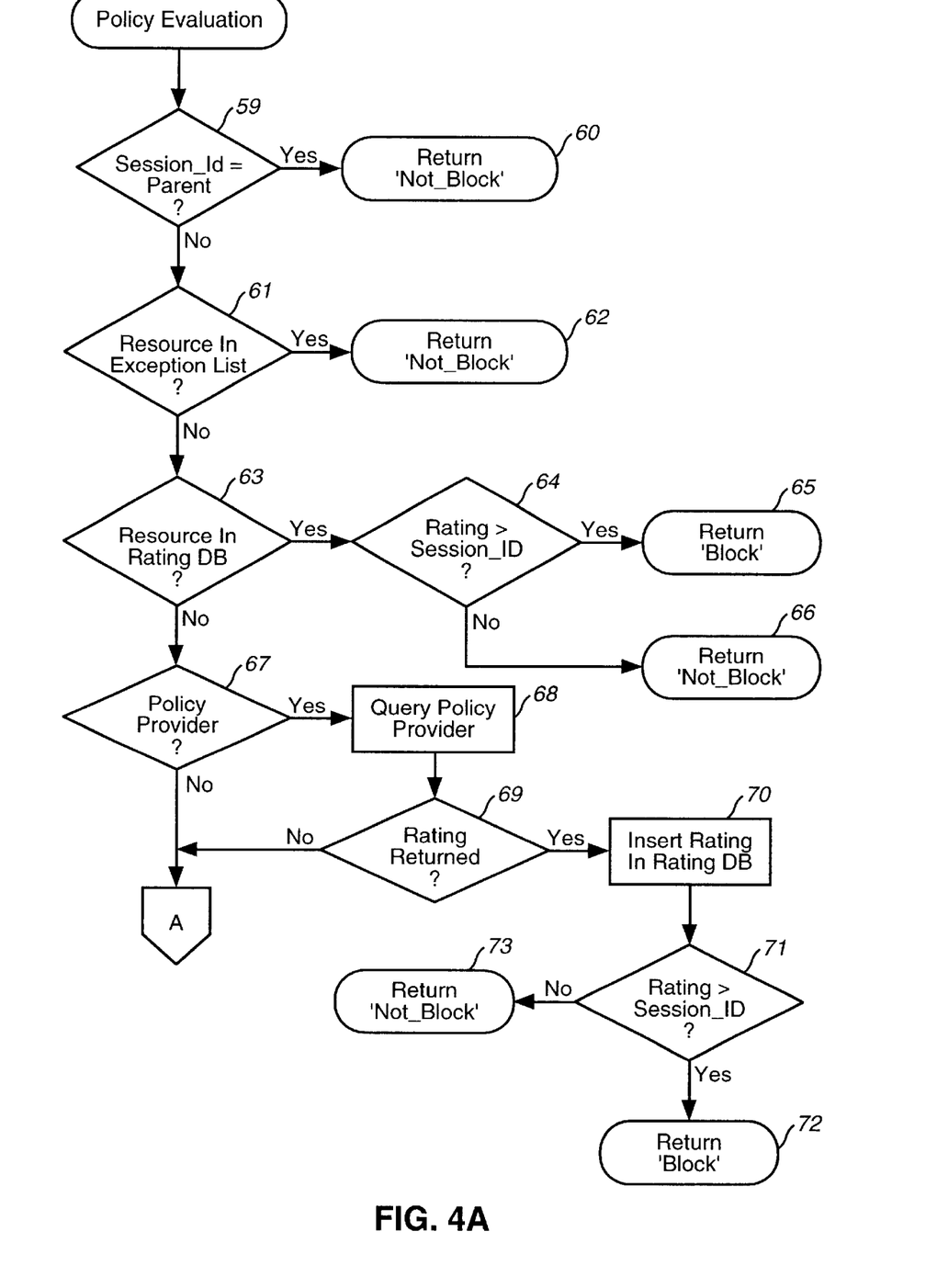
FIG. 4 is a flowchart of policy evaluation according to the present invention.

Referring now to FIG. 4A, there is shown details of policy evaluation processing. The system tests, at decision block 59, if the user session identifier indicates that the user is a parent. If so, the system returns not block, at terminator 60. If, on the other hand, the user session identifier indicates that the user is not a parent, then the system tests, at decision block 61 if the resource is in the exception list. If so, the system returns not block at terminator 62. If the requested resource is not in the exception list, then the system tests, at decision block 63, whether or not the requested resource is in the rating database. If so, the system tests, at decision block 64 if the rating in the database is greater than the user session identifier. If so, the system returns block at terminator 65. If, at decision block 63 the rating is not greater than the user session identifier, then the system returns not block at terminator 66.

If, at decision block 63, the resource is not in the rating database, then the system determines if the customer has designated a policy provider, at decision block 67. If so, the system queries the designated policy provider and implicitly waits at block 68. If, at decision block 69, the system receives a rating from the policy provider, then the system determines, at block 71, if the rating receive from the policy provider is greater than the user session identifier. If so, the system returns block at terminator 72. If, at decision block 71 the rating is not greater than the user session identifier, then the system returns not block at terminator 73. In addition, if a rating is returned from the policy provider, in step 69, the rating is stored in a rating data base at step 70 after 73.

Figure 4B:
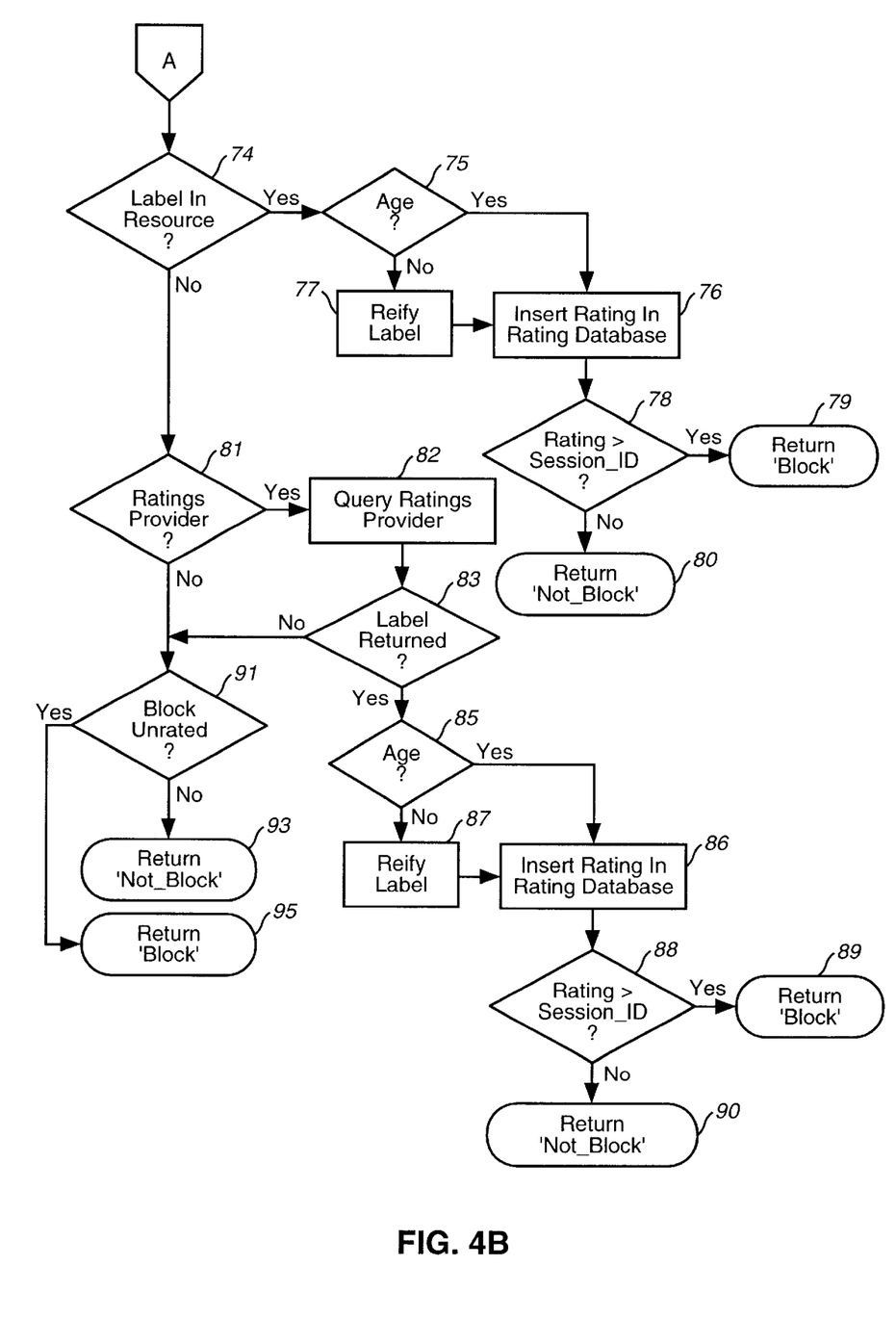

If, at decision block 69, the customer has not designated a policy provider, then the system determines, at decision block 74, FIG. 4B if there is a label in the resource. If so, the system tests, at decision block 75, if the label is an age. If so, the system inserts the rating in the rating database, at block 76. If the rating is not an age, then the system reifies label to an age rating, at block 77, and inserts the rating into the rating database, at block 76. Then, the system tests, at decision block 78 if the rating produced by the reifier is greater than the user session identifier. If so, the system returns block at terminator 79. If, the rating is not greater than the user session identifier, then the system returns not block at terminator 80.

If, at decision block 74, there is not a label in the document, the system determines, at decision block 81, if the customer has designated a ratings provider. If so, the system queries the designated ratings provider and implicitly waits at block 82. If, at decision block 83, the system receives a label from the ratings provider, the system tests, at decision block 85, if the label is an age. If so, the system inserts the rating in the rating database, at block 86. If the rating is not an age, then the system reifies the label to an age rating, at block 87, and inserts the rating into the rating database, at block 86. Then, the system tests, at decision block 88 if the rating produced by the reifier is greater than the user session identifier. If so, the system returns block at terminator 89. If, the rating is not greater than the user session identifier, then the system returns not block at terminator 90.

If, at decision block 81, the customer has not designated a ratings provider, then the system tests, at decision block 91, if the current user session identifier indicates that unrated pages should be blocked. If not, the system returns not block at terminator 93. If, on the other hand, the current user session identifier is set to block unrated sites or resources, then the system returns block at terminator 95.

Figure 5:
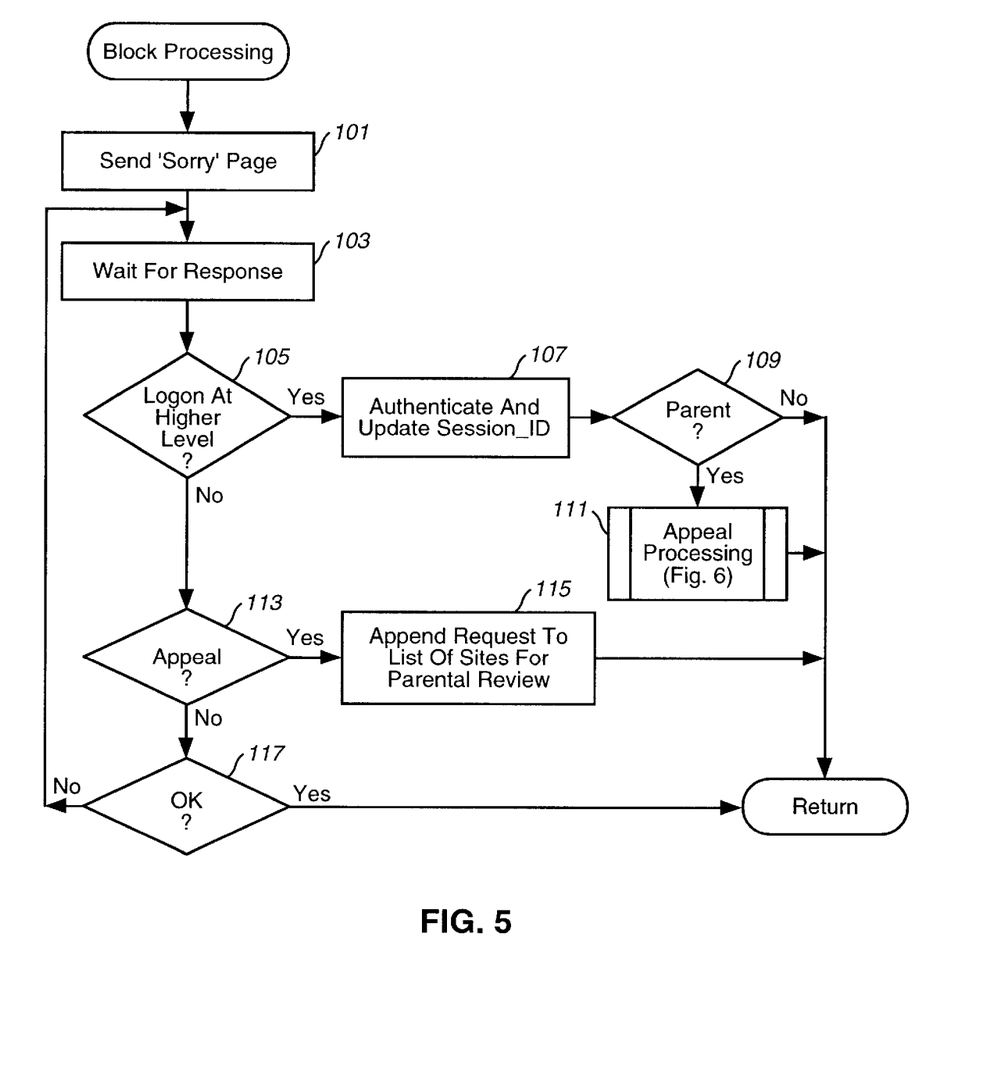
FIG. 5 is a flowchart of block processing according to the present invention.

Referring now to FIG. 5, there is shown a flow chart of block processing. First, the system sends a "sorry" page, at block 101, and waits for a response, at block 103. The sorry page notifies the user that the requested resource has been blocked and includes controls that enable the user to logon at a higher level, appeal the block, or accept the block. If, at decision block 105, the user selects logon at a higher level, the system authenticates the higher level logon and updates the user session identifier, at block 107. Then, the system tests, at decision block 109, if the new user is a parent. If not, processing returns to block 45 of FIG. 3. If, at decision block 109, the new user is a parent, then the system performs appeal processing as indicated generally at block 111 and shown in detail with respect to FIG. 6.

If, at decision block 113 the user selects the appeal control from the sorry page, the system appends a locator for the request to the list of sites for parental review, at block 115 and returns. If, at decision block 117, the user accepts the block, by selecting an "OK" control, processing returns to block 45 of FIG. 3.

Figure 6:
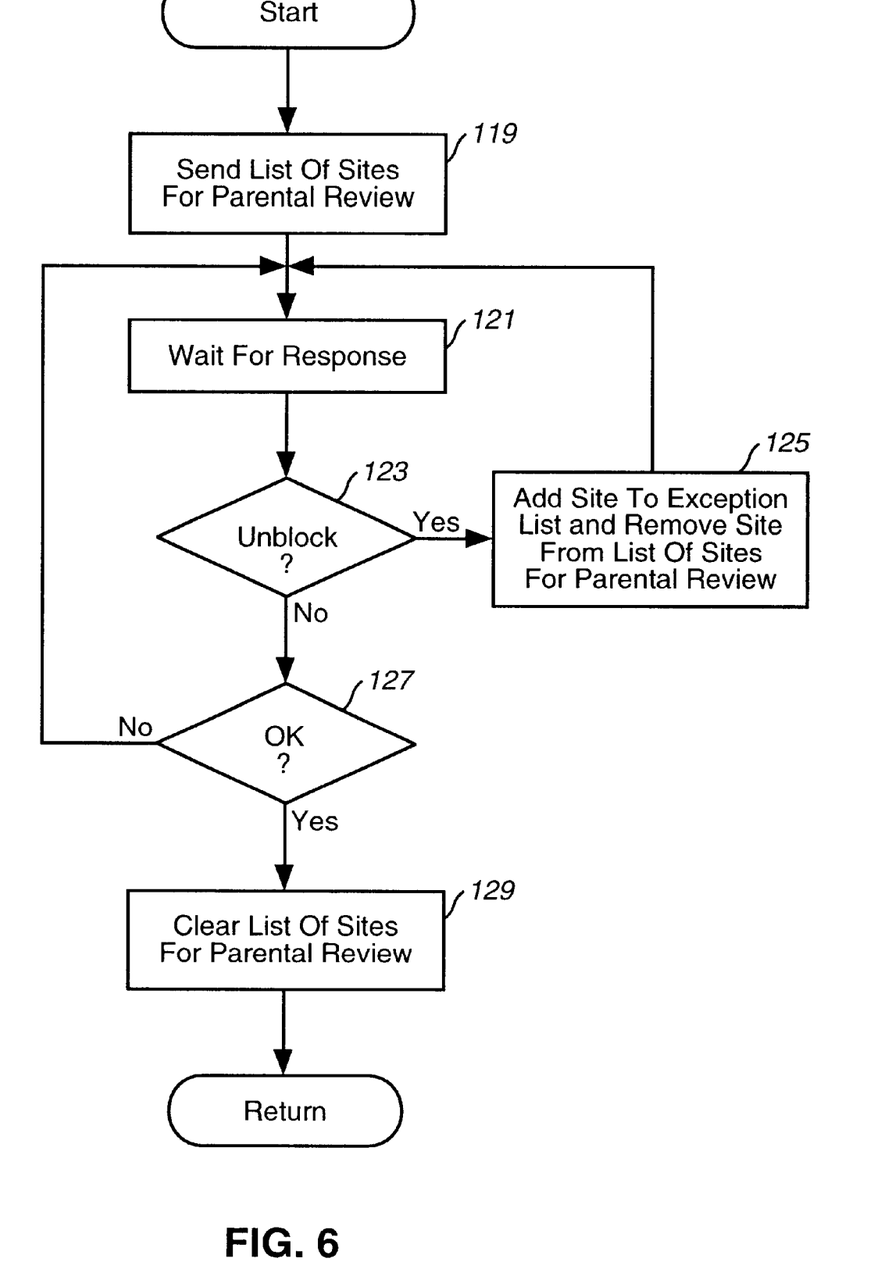
FIG. 6 is a flowchart of appeal processing according to the present invention.

Referring now to FIG. 6, there is shown a flow chart of appeal processing according to the present invention. Upon determining that the new user is a parent, the system sends a list of sites for parental review, at block 119, and waits for a response, at block 121. The parent can review each site on the list if the parent so chooses. If the parent determines that he or she has no objection to the child viewing an appealed site, then the parent can select an unblock control on the list of sites, at decision block 123. If the parent does select the unblock control, then the system adds the site to the exception list and removes the site from the list of sites for parental review, at block 125. When the parent is finished with the list of sites for parental review, the parent can select an OK control at decision block 127. Selection of the OK control clears the list of sites for parental review, at block 129 and the system returns to block 45 of FIG. 3.

From the foregoing, it may be seen that the present invention provides a method and system that includes authentication components that identify individual end users and filtering tools that manage policy enforcement according to policy evaluations by third parties. With the present invention, Internet access providers can address not only the current objectionable content debate, but future debates over consumer privacy, intellectual property rights, and mobile code safety. Moreover, the present invention provides a flexible, secure, and easy to configure system that allows Internet access providers to provide content filtering to their customers without becoming censors.

What is claimed is:

1. A method of controlling access to the Internet by members of a family, which comprises the computer implemented steps of:

maintaining for each member of a family a session identifier, each said session identifier including an age field that contains an age set for the family member and a parent field that indicates whether or not the family member is a parent;

maintaining for said family a list of resources for parental review; and, maintaining for said family at least one exception list of resources approved for access by a child of said family.

2. The method as claimed in claim 1, including the computer implemented steps of maintaining an exception list for each child of said family.

3. The method as claimed in claim 1, including the computer implemented steps of:

establishing an Internet session between a member of said family and the Internet; and, initially setting a user session identifier for said Internet session to a default session identifier.

4. The method as claimed in claim 3, wherein said default user session identifier is the session identifier for the youngest non-parent member of said family.

5. The method as claimed in claim 3, including the computer implemented steps of:
   in response to a request for a resource, determining if an age level rating for said resource is greater than the value of the age field of said default user session identifier; and,
   blocking said resource if said age rating is greater than the value of the age field of said default user session identifier.

6. The method as claimed in claim 5, including the computer implemented steps of:
   in response to blocking said resource, prompting said family member to logon as a specific member of said family;
   in response to a logon as a specific family member, authenticating said logon as said specific member of said family; and,
   in response to authentication of said logon as said specific member of said family, setting an updated user session identifier to the session identifier for said specific member of said family.

7. The method as claimed in claim 6, including the computer implemented step of:
   if said specific family member is a parent, presenting to said parent said list of resources for parental review.

8. The method as claimed in claim 7, including the computer implemented step of:
   prompting said parent to select for inclusion in said exception list resources from said list of resources for parental review.

9. The method as claimed in claim 6, including the computer implemented steps of:
   prompting said family to appeal said blocking;
   in response to an appeal of said blocking, appending a locator for said resource to said list of resources for parental review.

10. The method as claimed in claim 1, including the computer implemented steps of:
    establishing an Internet session between a member of said family and the Internet; and,
    setting a user session identifier for said Internet session to the session identifier of said family member.

11. The method as claimed in claim 10, including the computer implemented steps of:
    in response to a request for a resource, determining if the parent field of said user session identifier is set to parent; and,
    providing said resource if said parent field is set to parent.

12. The method as claimed in claim 10, including the computer implemented steps of:
    in response to a request for a resource, determining if said resource is in said exception list; and,
    providing said resource if said resource is in said exception list.

13. The method as claimed in claim 10, wherein each session identifier includes a field that indicates whether not unrated resources are to be blocked.

14. The method as claimed in claim 13, including the computer implemented steps of:
    in response to a request for a resource, determining if said resource is unrated; and,
    blocking said resource if said resource is unrated and said user session identifier indicates that unrated resources are to be blocked.

15. The method as claimed in claim 10, wherein a policy provider is associated with said family.

16. The method as claimed in claim 15, including the computer implemented steps of:
    in response to a request for a resource, querying the policy provider for said family for a rating for said resource; and,
    blocking said resource if a rating for said resource is greater than the value of the age field of said user session identifier.

17. The method as claimed in claim 15, including the steps of:
    in response to a request for a resource, querying the policy provider for said family for a determination if said resource is suitable for the age specified in said age field of said user session identifier; and,
    blocking said resource if said resource is determined to be not suitable for the age specified in the age field of said user session identifier.

18. The method as claimed in claim 10, including the computer implemented steps of:
    in response to a request for a resource, determining if said resource has a rating;
    determining if said rating is an age rating; and,
    blocking said resource if the age rating is greater than the value of the age field of said user session identifier.

19. The method as claimed in claim 18, including the computer implemented step of:
    if said received rating is not an age rating, converting said received rating to an age rating.

20. A method of controlling access to the Internet by members of an organization, said organization including at least one supervisor and at least one non-supervisor for which limited Internet access is desired, which comprises the computer implemented step of:
    maintaining for each member of said organization a session identifier, each said session identifier including an access level field that contains an access level set for the organization member and a supervisor field that indicates whether or not the organization member is a supervisor.

21. The method as claimed in claim 20, including the computer implemented steps of:
    establishing an Internet session between a member of said organization and the Internet; and,
    initially setting a user session identifier for said Internet session to a default session identifier.

22. The method as claimed in claim 21, wherein said default session identifier is the session identifier for the lowest access level of said organization.

23. The method as claimed in claim 21, including the computer implemented steps of:
    in response to a request for a resource, determining if an access level rating for said resource is greater than the value of the access level field of said default user session identifier; and,
    blocking said resource if said access level rating is greater than the value of the access level field of said default user session identifier.

24. The method as claimed in claim 23, including the computer implemented steps of:
    in response to blocking said resource, prompting said organization member to logon as a specific member of said organization;
    in response to a logon as a specific organization member, authenticating said logon as said specific member of said organization; and, in response to authentication of said logon as said specific member of said organization, setting an updated user session identifier to the session identifier for said specific member of said organization.

25. The method as claimed in claim 24, including the computer implemented step of:

maintaining for said organization a list of resources for supervisor review and, if said specific organization member is a supervisor;

presenting to said supervisor said list of resources for supervisor review.

26. The method as claimed in claim 25, including the computer implemented step of:

maintaining for said organization at least one exception list of resources approved for access by a non-supervisor member of said organization; and, prompting said supervisor to select for inclusion in said exception list resources from said list of resources for supervisor review.

27. The method as claimed in claim 23, including the computer implemented steps of:

prompting said organization member to appeal said blocking;

in response to an appeal of said blocking, appending a locator for said resource to a list of resources for supervisor review.

28. The method as claimed in claim 20, wherein:

said organization is a family;

said supervisor is a parent; and, said non-supervisor is a child.

29. The method as claimed in claim 28, wherein said access level is an age.

30. A system for controlling access to the Internet, which comprises:

an authentication database, said authentication database including a session identifier for each member of an organization, each said session identifier including an access level for a member of the said organization;

an authentication server, said authentication server including means for accessing said authentication database to obtain a user session identifier in response to a logon by a member of an organization; and, a filtering proxy, said filtering proxy including means for receiving requests for Internet resources, and means for tagging requested resources with a user session identifier received from said authentication server; and, a policy evaluator, said policy evaluator including means for returning a block message to said filtering proxy based upon a user session identifier tagged to a requested resource.

31. The system as claimed in claim 30, wherein said filtering proxy includes means for blocking a requested resource upon receipt of a block message from said policy evaluator.

32. The system as claimed in claim 31, wherein said filtering proxy includes means for prompting a member to logon at higher access level.

33. The system as claimed in claim 31, wherein said filtering proxy includes means for prompting a member to appeal a blocking of a requested resource.

34. The system as claimed in claim 33, including:

a list of resources for supervisor review; and, an appeals administrator, said administrator including means for inserting locators for appealed resources into said list of resources for supervisor review.

35. The system as claimed in claim 34, including:

an exception list for an organization, said exception list including a list of resources approved for access by a member of said organization.

36. The system as claimed in claim 35, wherein said appeals administrator includes means for inserting locator from said list of resources for supervisor review into said exception list.

37. The system as claimed in claim 36, wherein said policy evaluator includes means for accessing said exception list.

38. A method of controlling access by members of an organization to resources, said organization including at least one supervisor member and non-supervisor members, said method comprising the computer implemented steps of:

in response to a request for access to a resource by a non-supervisor member, determining if said requested resource is suitable for said non-supervisor member; and, blocking access to said requested resource if said requested resource is determined to be not suitable for said non-supervisor member.

39. The method as claimed in claim 38, wherein:

said organization is a family;

said supervisor member is a parent; and, and said non-supervisor members include children.

40. The method as claimed in claim 38, wherein said resources include Internet resources.

41. The method as claimed in claim 38, wherein said step of determining if said requested resource is suitable for said non-supervisor member includes the computer implemented step of:

consulting a policy provider for a determination of the suitability of said requested resource for said non-supervisor member.

* * * * *